United States Patent [19]

Franz et al.

[11] Patent Number: 4,485,060
[45] Date of Patent: Nov. 27, 1984

[54] PROCESS FOR PREPARING DUST-FREE PARTICLES

[75] Inventors: Peter Franz, Birsfelden; Hans Seipp, Pratteln, both of Switzerland

[73] Assignee: Buss AG, Basel, Switzerland

[21] Appl. No.: 405,245

[22] Filed: Aug. 4, 1982

Related U.S. Application Data

[63] Continuation of Ser. No. 205,324, filed as PCT EP79/00096, Dec. 6, 1979, published as WO80/01148, Jan. 12, 1980, § 102(e), dated Aug. 5, 1980, abandoned.

[30] Foreign Application Priority Data

Dec. 7, 1978 [CH] Switzerland ............... 12513/78

[51] Int. Cl.³ .................................................. B29B 1/02
[52] U.S. Cl. .................................... 264/102; 264/118; 264/142; 264/349; 425/202; 425/203; 425/205; 425/308; 425/311
[58] Field of Search ............... 425/308, 309, 311, 202, 425/203, 205; 264/118, 102, 142, 349

[56] References Cited

U.S. PATENT DOCUMENTS

| | | | |
|---|---|---|---|
| 1,946,740 | 2/1934 | Hall | 425/311 |
| 2,583,600 | 1/1952 | Schreiber | 425/311 |
| 3,003,193 | 10/1961 | Chisholm et al. | 264/141 |
| 3,595,533 | 7/1971 | Sutter | 264/118 |
| 3,861,844 | 1/1975 | Miller | 425/311 |
| 3,868,469 | 2/1975 | Chalin | 425/308 |
| 3,920,783 | 6/1966 | Hara et al. | 425/308 |
| 3,976,799 | 8/1976 | Kelly et al. | 425/311 |
| 4,078,874 | 3/1978 | Lenhardt | 425/309 |
| 4,244,903 | 1/1981 | Schnause | 264/118 |

FOREIGN PATENT DOCUMENTS

| | | | |
|---|---|---|---|
| H 21945 | 9/1955 | Fed. Rep. of Germany | 425/309 |
| 426215 | 6/1967 | Switzerland | 425/309 |

Primary Examiner—James Lowe
Attorney, Agent, or Firm—A. A. Saffitz

[57] ABSTRACT

A continuous process for carrying out the process for preparing substantially dust-free thermoset plastic particles from soft plastic mixtures of reactive thermoset plastic-forming materials and volatile components. These soft mixtures which quickly harden after drying are extruded under low pressure and are granulated by cutting while soft. To eliminate excessive amounts of dust the invention uses a premixer and a worm conveyor in a special housing and the conveyor flights are at a low angle of inclination to the horizontal to extrude the soft mixture at low pressure. The soft material at the outlet of the special material is pushed out of the nozzle under a worm rotation which is less than 25 r.p.m. and a pressure is of the order of one pound after which the material is conveyed pneumatically to a cooling station to harden and after cooling is cut into uniform size particles by knives without the formation of dust.

4 Claims, 10 Drawing Figures

PROCESS FOR PREPARING DUST-FREE PARTICLES

This is a continuation of application Ser. No. 205,324, filed as PCT EP79/00096, Dec. 6, 1979, published as WO80/01148, Jun. 12, 1980, § 102(e) dated Aug. 5, 1980, and now abandoned.

BACKGROUND OF THE INVENTION

1. Field of the Invention

The invention relates to a continuous granulating process and granulating apparatus for the substantially dust-free preparation of uniform granulated small particles or pellets of quickly hardening reactive plastic mixtures, e.g. which harden quickly after the ingredients are homogenized and ejected from a continuously operating material preparation screw conveyor machine.

2. Brief Description of the Prior Art

Special efforts have been made in the prior art to improve the technology of material preparation because of the problems which arise in the obstruction or clogging of the outlet perforated nozzle plate of the material preparation machine while at the same time meeting the need for a dust-free granulated product. Such dust-free products are required as stable catalysts, as raw materials for smelting processes and for baking. Previously cross-linked macromolecular plastics with or without reinforcing fibers are molded in presses and may also be used as reactive fillers but these harden quickly after homogenization so that screw machinery in which these mixtures are formed becomes obstructed and clogged. It is frequently necessary to include additives to delay hardening. With many mixtures of this quickhardening type, additives are undesirable or prohibited. With other mixtures, such as catalysts almost immediate hardening by an additive permits baking to a dust-free condition. The latter is especially important in preparing noble metal catalysts since recovery of the noble metal from the dust makes catalyst preparation expensive but the additive may not be wanted.

Some proposals for granulation using worm extruders in the past 30 years are described in certain publications as follows:

Schneider and Brooks, *Plastics Institute Transactions* 26 (1958) Vol. 64 Page 17;

Timm, Stoltzenberg and Fettback, *Kautschuk and Gummi, Kunststoffe* 18 (1965) Page 206;

Herrmann, *Plastics* October 1967 Page 1225 FIG. 3 and FIG. 6.

The last named publication shows that the material which leaves the compounding machine is in the form or irregularly formed large pieces. In FIG. 6 of this publication the material is cooled, ground to a fine grain and a dust content of 30% is noted for this conventional process shown in FIGS. 3 and 6. The dust is removed by screening which means a loss in production which may reach 300 kg per hour at a throughput of 1,000 kg per hour. Under favorable conditions, up to 10% of this 300 kg per hour of dust may be blended with the regular granules in the compounding machine for subsequent operations. However, for injection molding dust-free particles are required and similarly dust-free material is required in transfer molding.

It is difficult to justify production of 700 to 800 kg per hour for a total production amount of 1,000 kg per hour. To overcome this problem, a perforated nozzle plate was proposed for the compounding machine and there was added a revolving knife to cut the mixture emerging from the nozzle plate into small pieces. However, the so modified compounding machines fitted with nozzle plate and revolving knife still became obstructed and blocked in a short time. For example, the machine shown in Gresch Swiss Pat. No. 426215 Gresch proposes a deep worm gear with declining core diameter, a length of 1.35 L/P, a high rate of rotation of the worm and a wedge shaped work space between the end of the worm gear. The extruded material in this wedge space is placed under high compression which leads to obstruction at the plate.

In the book "Schneckenmachinen in der Verfahrenstechnik", Springer 1972, Hermann describes the ZSK compounding machine and the ZDS-K compounding machine in detail. At page 128 of this book there is described the possibility of combining these machines with a deep-cut, slow running single cycle ES-A machine having a large diameter and a length of 6 to 8 L/D for use in granulating thermoplastic batches.

The Gresch Swiss patent above was modified according to this Hermann text but this modified procedure was abandoned because, after the first promising experiments, it turned out that continuous operation could not be successfully carried out.

OBJECTS OF THE INVENTION

An object of the invention is to provide a continuous process for the production of dust-free uniform small particles from soft plastic reactive thermosetting mixtures and volatile ingredients which are quickly hardening after homogenization to provide uniform particles without dusting comprising first premixing the reactive plastic and volatiles and then homogenizing in a heated pelleting machine comprising a continuously slow working machine for shaping the soft mixture at the outlet, then cooling and cutting by cutting means after which the cut pieces are conveyed pneumatically for producing dust-free particles of uniformly cut size.

Another object of the invention is to provide a continuous process for pelletizing mixtures of soft reactive plastic and volatile ingredients which may include fillers and hardeners and other additives in which process a first premixing is carried out to form the soft mixture, the mixture so formed passes through a tube and into a heated pelletizing machine which can be cooled and has a length of the conveyor screw therein which is from 3 to 5 times the diameter of the conveyor and in which the conveyor screw rotates from 10 to 25 revolutions per minute, the screw flight having a pitch of about $\frac{1}{2}$ the screw diameter, thereby having a thick core so that there is no build-up of pressure of the soft material which is conveyed out of a multiple holed die plate in a condition to prevent hardening of the mixture so that cutting can be easily performed without creating dusty fragments as a result of cutting.

SUMMARY OF THE INVENTION

The method and apparatus of the invention combine a material mixing machine for homogenizing plastic materials formed of reactive components and volatile components with a low pressure worm conveyor at a separate location. The low pressure conveyor is fitted with a special nozzle at the outlet and comprises a cooled worm gear, cooled cylindrical housing and cooling means for the material extruded from the special outlet nozzle. The worm gear and housing are of specified length L which is from 3 to 5 times the diameter D of the conveyor. The worm gear has a slight angle of inclination of the spiral forming the worm in relation to the worm axis and this slight angle cooperates with the special cylindrical housing which is formed with longitudinal cross strips made by parallel ribs with deep grooves on the interior of said cylindrical housing wherein the width of the cross strips between the ribs is less than the depth of the longitudinal grooves. The strip or fillet shape of the soft mixture results.

The reactive components which are quickly hardening at elevated temperatures generally create excessive dusting when granulated by cutting knives. This objectionable dusting is eliminated by the low pressure extrusion of the soft plastic mixture of reactive components in the special low transport pressure worm gear conveyor and housing having a low rotational velocity of the worm gear of from 10-25 revolutions per minute and a low angle of inclination with a special shape of narrow ribs and wide grooves in the housing to form deep broad fillets expelled from the special nozzle at the outlet of the low pressure conveyor.

The soft plastic material cut by the knives at the outlet of the low pressure special conveyor does not tend to form dust or fines. Cooling of the soft plastic material permits the cutting to be more efficient without the formation of dust. In this manner particles of predetermined particle size are formed by cutting and the excessive dust which is created in mixtures of this type is avoided.

In the recommended manner of operating, conveying takes place at low transport pressure and without undue pressure, practically pressurelessly, through the special exit nozzle. The worm gear, housing and nozzle are cooled by cooling means in such a way that the optimal liquid flow characteristics are achieved of the liquid mixture to facilitate the passage into the drilled holes of the perforated plate which is located just beyond the nozzle. The cooled surface of the extruded material which passes through the drilled holes becomes brittle so quickly after leaving the nozzle that it is essential that the extruded material be moved away pneumatically. The extruded material is cut by cutting means before moving the cut product away from the perforated plate and the details for this operation will be seen in the preferred examples. The invention will be explained in greater detail in the following by means of examples.

BRIEF DESCRIPTION OF THE DRAWINGS

The attached drawings show the preferred embodiments of the apparatus of the invention which is suitable for carrying out the continuous procedure of mixing, extrusion, cooling and cutting.

DESCRIPTION OF THE PREFERRED EMBODIMENTS

Figure 1:
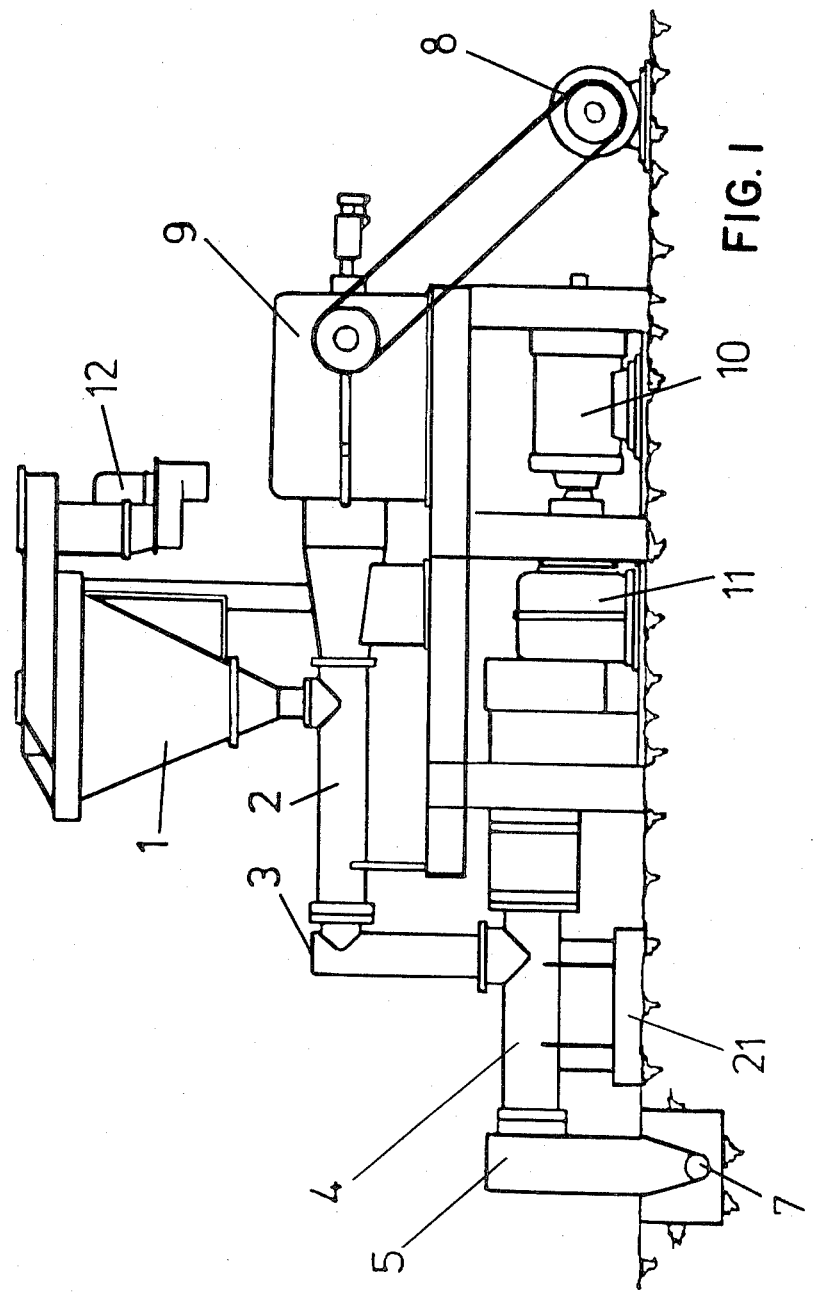
FIG. 1 shows a schematic side view of a preferred embodiment of the apparatus.

The apparatus shown schematically in FIG. 1 consists primarily of a mixing and granulating machine for preparing mixed thermosetting materials 2 which are in soft form and are subjected to a continuously-operating mixing and kneading operation and a granulating operation in the machine 4 which is provided with a worm conveyor. The machine for preparing the mixture of materials 2 has a filling funnel 1 which has a stirring shaft (not shown) that is set in rotation by a drive motor 12. The machine for mixing the materials 2 has a drive unit 9 with gearing to drive the mixing and kneading machine 4. The drive motor of the drive unit 9 is represented separately in the drawings by reference numeral 8. The components of the mixture which are premixed and put into the funnel 1 are homogenized in the machine and form the mixture of materials 2 in a soft condition.

More specific details of the construction of the material-preparation machines and various modifications for charging them are described in the Swiss Pat. Nos. 512,979, 519,013 and 577,372 all of which relate to the construction of kneading devices. However, other continuously-operating material-preparation machines which are suitable for homogenization may be used.

Figure 2:
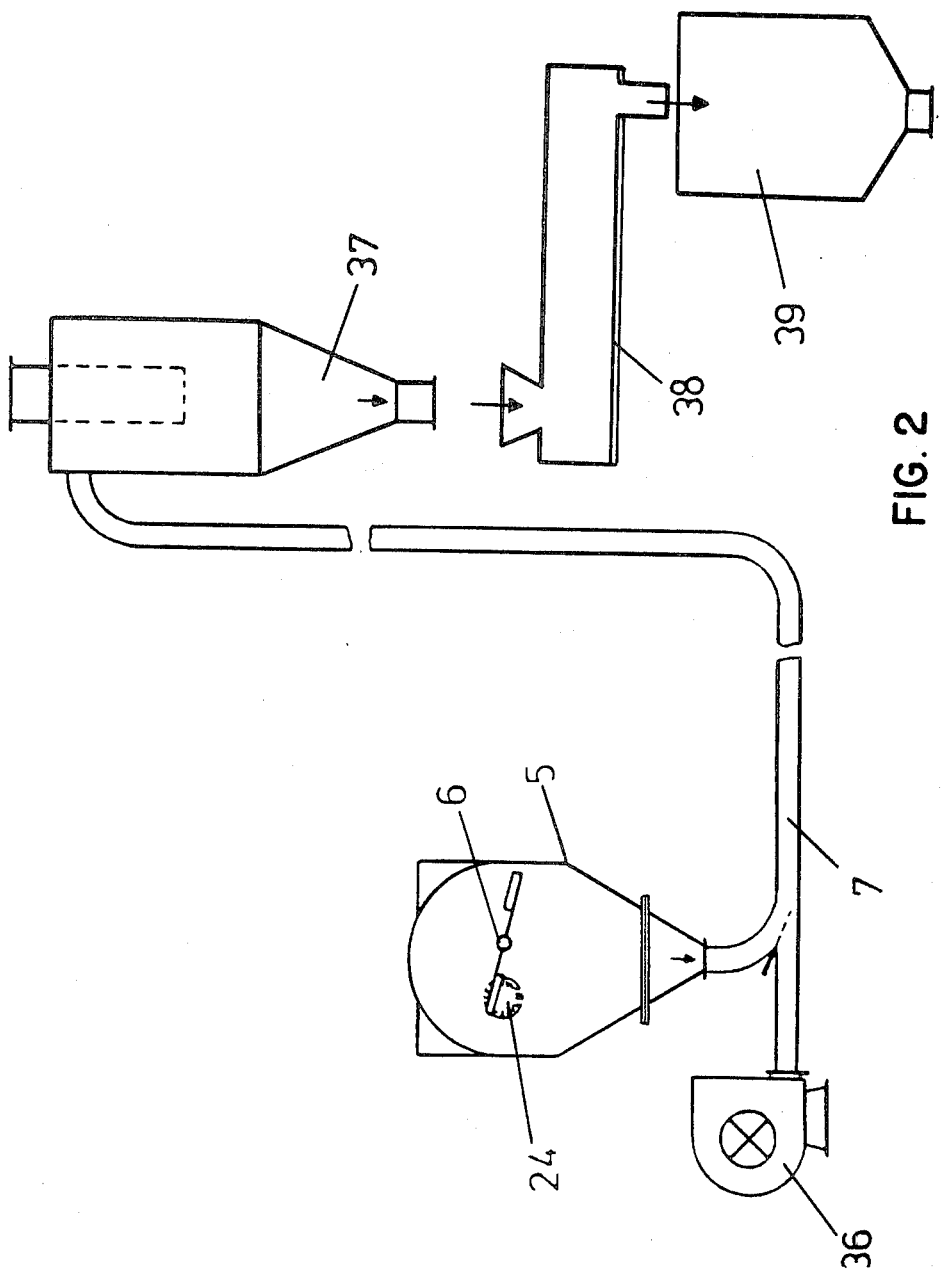
FIG. 2 is a schematic view of a pneumatic conveyor which is used for the pneumatic transport of the cut granulated material.

In FIGS. 1 and 2 the output side of the material preparation machine 2 provides the input for the granulating device 4 and the connecting shaft 3 shown in these Figs. facilitates the ejection of the material and the free fall of the ejected material from machine 2 through the connecting passageway for the shaft 3 which is so constructed to permit the removal of volatile components by suction means as will be described later. It is a feature of the invention that the mixture is ejected from the preparation machine through the inlet passageway into the granulation device 4 under practically no pressure and the special nozzle 24 of the granulating device 4 is provided with a perforated plate through which perforations the soft mixture is passed and the strips of material are then cut by rotating cutting knives 6 into granules. The cut granules collect in a collecting casing 5 which leads into a pneumatic conveyor line 7. The entire granulating device 4 is mounted on a support 21 and is driven by motor 10 with an adjustable reduction gear.

Figure 5:
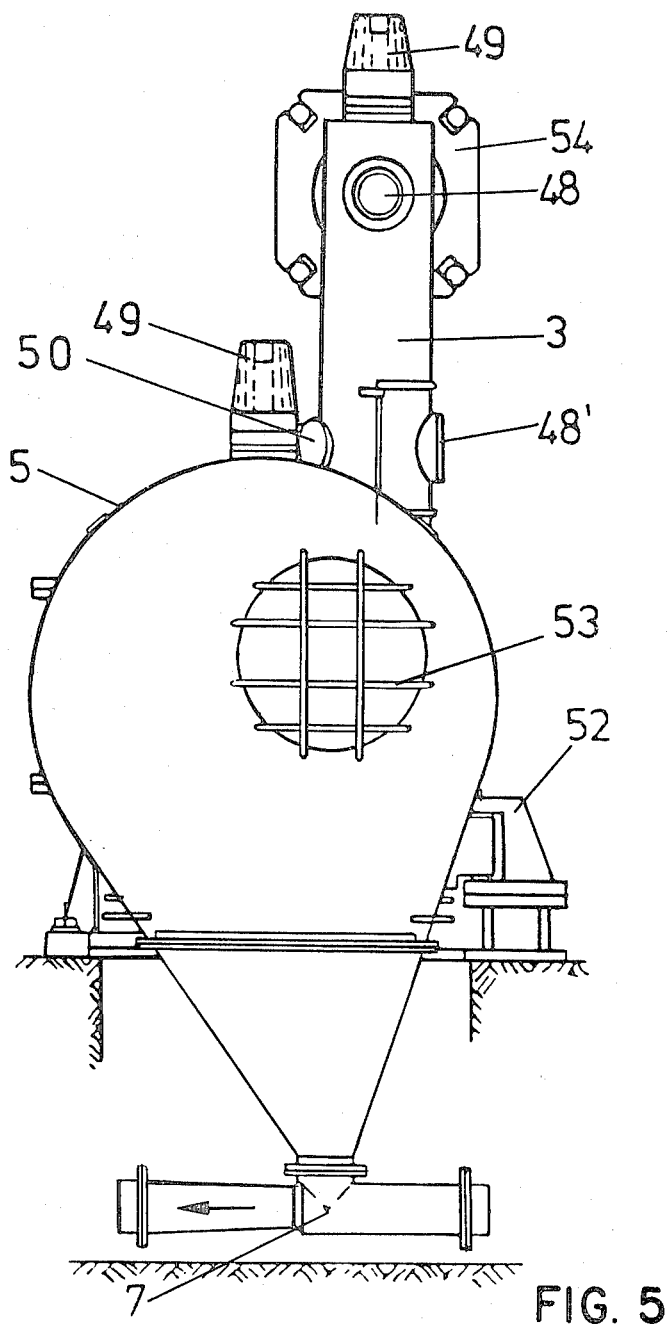
FIG. 5 is a front view of the apparatus of FIG. 1.
Figure 6:
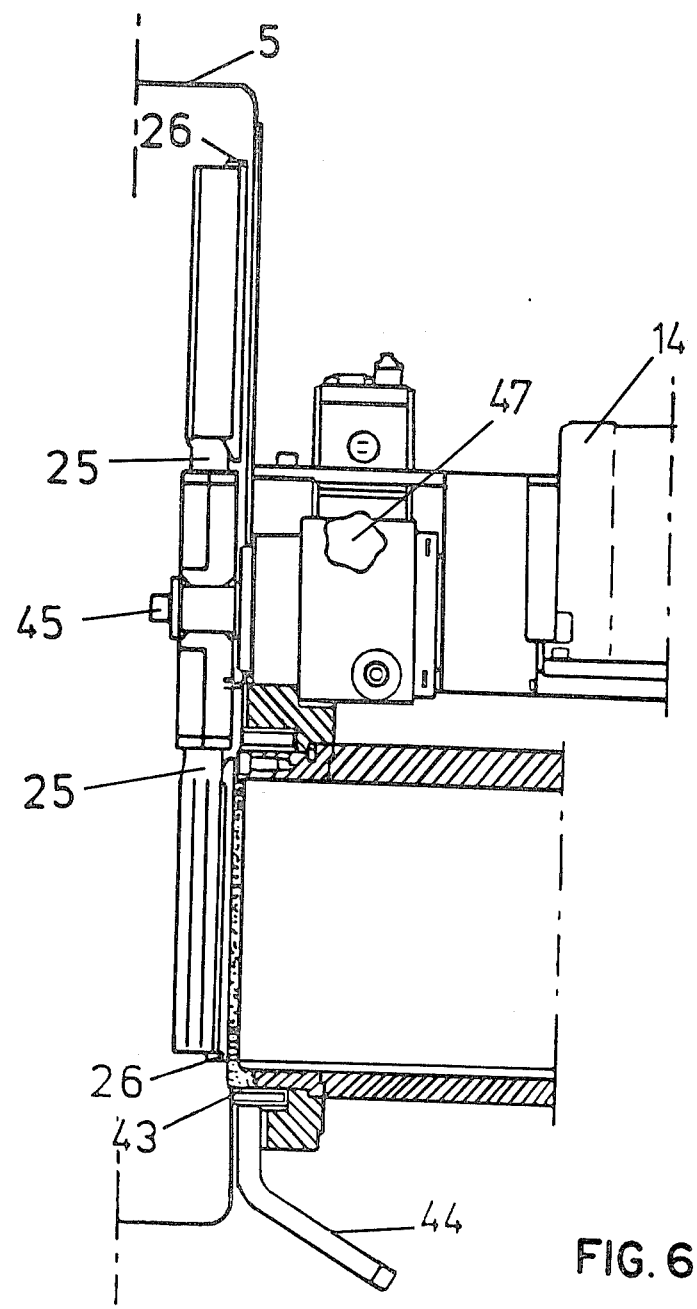
FIG. 6 shows the outer cutting unit for the apparatus of FIG. 1.
Figure 7:
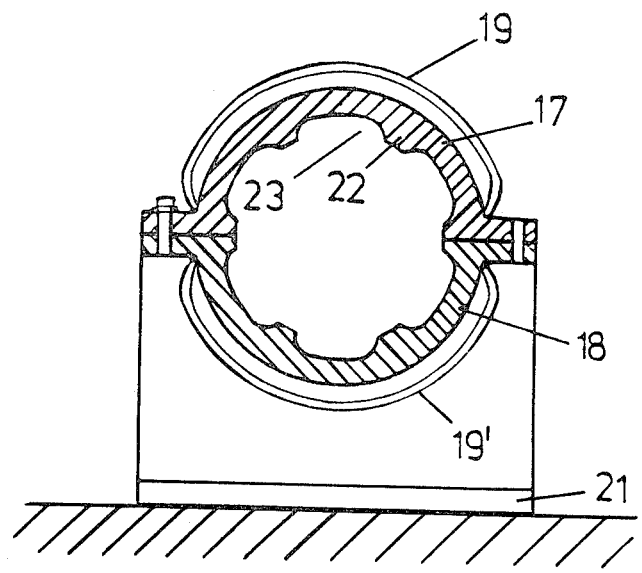
FIG. 7 is a transverse section through the housing of the worm conveyor of the mixing and granulating portions of the apparatus of FIG. 1.

As shown in FIG. 5 the rotating cutting knives 6 which are located in the collecting casing 5 are also connected to the cutting apparatus 37 by means of pneumatic conveyor line 7 and cooling means 38 serves to condition the granulated material the cooling means 38 being located adjacent to storage bin 39. The conveyor line 7 is provided with a fan 36 which aids in conveying cut material at cutting knives 6 by air flow in the cutting apparatus 37 and then into the collecting casing 5.

Figure 3:
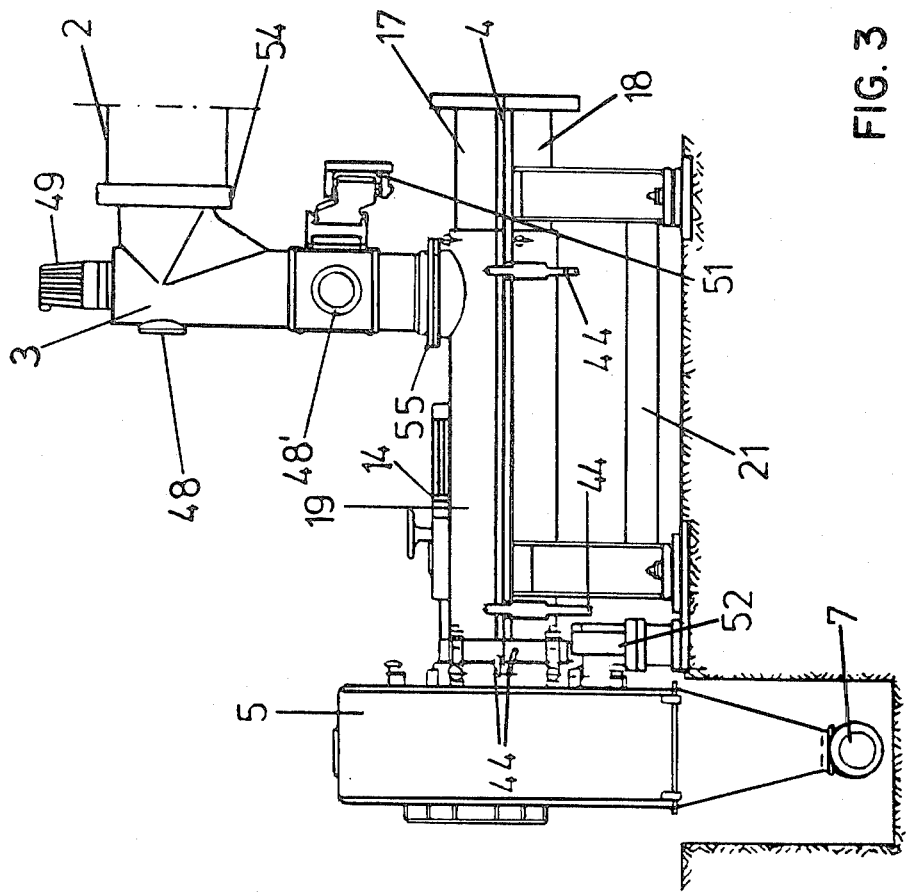
FIG. 3 is an enlarged side view of the granulating means which is partly shown in FIGS. 1 and 2.
Figure 4:
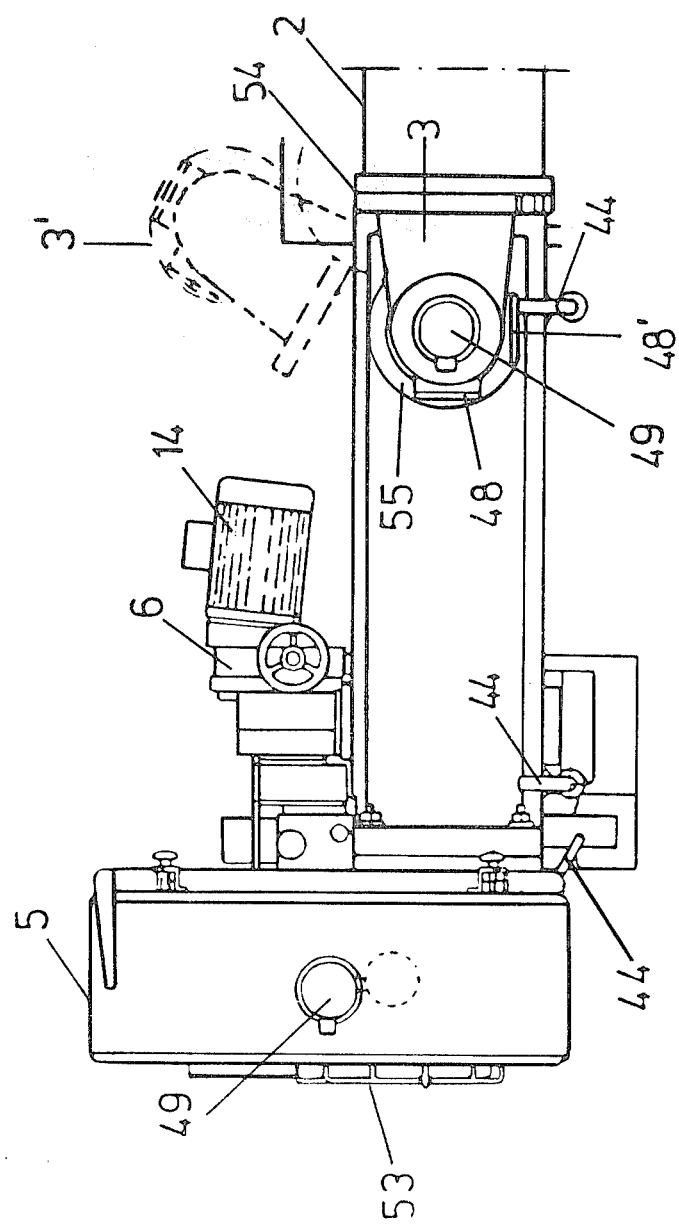
FIG. 4 is a plan view of the apparatus of FIG. 1 which is taken from above.

Additional details of the construction of the granulating device are shown in FIGS. 3 through 5, inclusive wherein connecting flange 54 is fitted on the discharge side of the material-preparation machine 2 and this flange connects to the connecting shaft 3 by means of four connecting swing bolts through the flange. To aid connection an inspection eyepiece 48 is located opposite the point of flange connection. The eyepiece 48 permits the observation of the discharging of the kneaded material from the material-preparation machine 2 since the inner space is illuminated by a lamp 49 provided for this purpose. The prepared product which is discharged traverses the passageway of the connecting shaft 3 in free fall to enter the granulating device 4. The connecting shaft 3 is attached to the housing of the granulating device 4 by means of a connecting flange 55. A flexible gas suction pipe can be installed on a connecting support 50 fastened to the side. A double toggle joint 51 is installed at the side of the connecting shaft 3 which is mounted on the base plate of the kneading device. The connecting shaft 3 can be swung out to the position 3' on the toggle joint 51 as shown in FIGS. 3 through 5. A second inspection eyepiece 48' is located in the lower part of the connecting shaft 3 through which the level of the material accumulating in this portion of the granulating device 4 can be observed. Thus, if the material accumulating in the granulating device 4 is not being processed, a rising of the level of that material will be observed through the second inspection eyepiece. If one sees that the level is rising, the speed of the worm gear of the granulating device 4 should be altered to cut down the throughput. It is also possible to install a measuring and sensing element on the shaft which will trigger a signal if the material rises too high.

The granulating device 4 as shown in FIGS. 3 through 5 is provided with a separate worm-gear housing formed in two parts in the horizontal plane, with the upper part 17 and the lower part 18 of the housing being held together by flanges and each of these two parts having a jacket 19 and 19', respectively for a heating or cooling agent and for this purpose conduits 44 serve to deliver or remove the heating or cooling agent. The upper part 17 of the worm-gear housing after the feeding and discharge conduits 44 are separated and the screw connections are loosened, is fastened to suspension loops and is easily removed by any conventional lifting apparatus. The lower part 18 of the worm-gear housing is adjustably supported on base plate 21 by means of adjusting screws. The collecting case 5 with the cutting device 6 and its drive motor 14 is mounted on the base plate 21. An adjusting button 47 is provided for the motor 14. The motor 14 also drives the cutter spindle 45 which is connected to the base plate by means of the rocking lever 52.

The inside surface of the worm-gear housing is specifically constructed to facilitate low pressure. The inner wall of the upper and lower parts 17 and 18 of the housing has wide, longitudinal sections 23 which are separated from each other by narrow crosspieces 22. The width dimension of the crosspiece 22 is less than the depth dimension of the longitudinal section 23. In conventional worm-gear construction, the inner wall is provided with narrow longitudinal sections rather than wide sections. In the conventional worm-gear housing the pressure builds up because of the steep angle of inclination of the flights of the worm. Because of the radical change from narrow to wide dimensions, which is part of the conventional worm-gear high pressure operation, there is a tendency for the material being processed to rotate with the worm shaft, e.g., induced rotation. Both of these tendencies, e.g., pressure build up and induced rotation are overcome by the special structural modification of the inside surface of the worm-gear housing. This is an especially important advantage since the friction resulting from the combination of pressure and an induced rotation and the heat which results would bring about a rapid hardening of the thermosetting reactive material which is being processed. The longitudinal sections in the housing constitute a means of anchoring the material and transporting the material by pushing; in this sense it can be compared with moving a nut on a bolt at a very low pressure.

Figure 8:
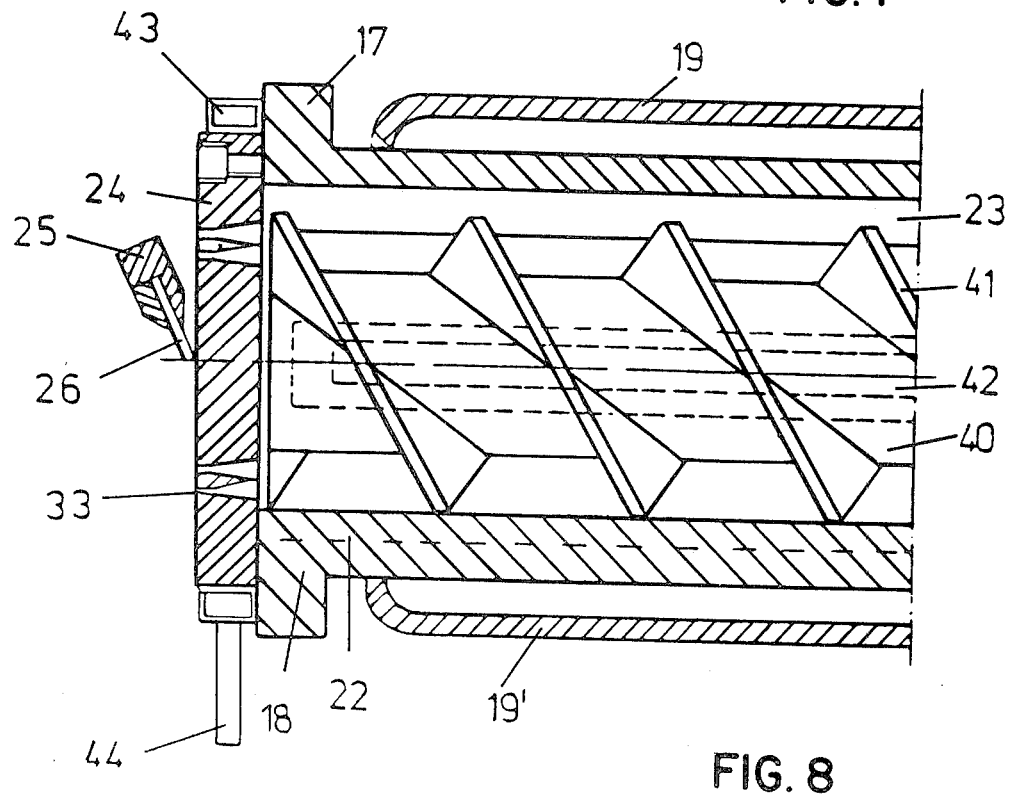
FIG. 8 is a longitudinal section taken through the housing, the nozzle and the nozzle plate with the cutting knife shown for cutting the extruded material to a predetermined size.

In FIG. 8 worm shaft 40 is shown with spiral flights 41, the shaft 40 being drilled with holes to deliver a cooling or a heating agent through a heating tube 42, the heating tube 42 constituting a rotating fitting head threadly connected to the worm shaft. This threaded connection makes the removal of the shaft from the fitting head easy and permits the entire heating bundle to be separated at the flange of the worm shaft 40. A swivel 52 is located on the front of the mounting plate 21. This swivel permits the entire granulating device 4 to be swung to the side and easily cleaned.

The construction of the preferred special nozzle 24 with a plurality of nozzle holes 33 in the nozzle extrusion plate closing off the worm-gear housing of the granulating device is shown in FIGS. 3 through 5. Cutter blade 26 mounted on knife arm 25 is installed on the outside of the special nozzle 24 and a heating collar 43 provided with conduit 44 serves to bring a heating medium into the nozzle to temper or heat the soft plastic mixture being extruded through the nozzle holes 33.

As shown in FIGS. 3 through 5 worm-gear shaft 40 has a vertical inclination to the horizontal axis expressed as rise of 0.5 D where D is the casing diameter, the angle measured at the location of the soft plastic material as it is pushed to the very edge of the rotating worm spiral and is then extruded through the holes 33 without undue pressure through the worm nozzle or plate. It has been found that all soft plastic materials varying in viscosity to highly viscous liquid materials tend to become brittle and hard after passing through the holes 33 of the perforated plate, yet these materials can be easily conveyed by pneumatic means in accordance with the invention. The extruded materials can also be collected in a liquid medium by being floated and can be moved on the liquid in the floating condition.

Because of the completely closed construction of the granulating apparatus as shown 4, as well as of the material-preparation apparatus 2 the admission of air to the material content can be effectively prevented as long as the materials are being physically processed within the apparatus and until the material emerges from the holes 33 of the perforated plate. This is an important advantage in the cold mixing of plastic material additives and liquid components generally done to effect homogenization while cold, particularly those mixtures which undergo immediate solidification upon contact with air. It is contemplated that an inert gas to replace air can be supplied to the material-preparation apparatus 2 and granulating apparatus 4 and for this purpose the connecting piece 50 on the connecting shaft 3 may be used as a connection for inert gas, in which case, the air grating 53 on the collecting casing 5 is closed, and the gas employed for pneumatically conveying the material is the inert gas which is carried within the closed circuits.

Figure 9:
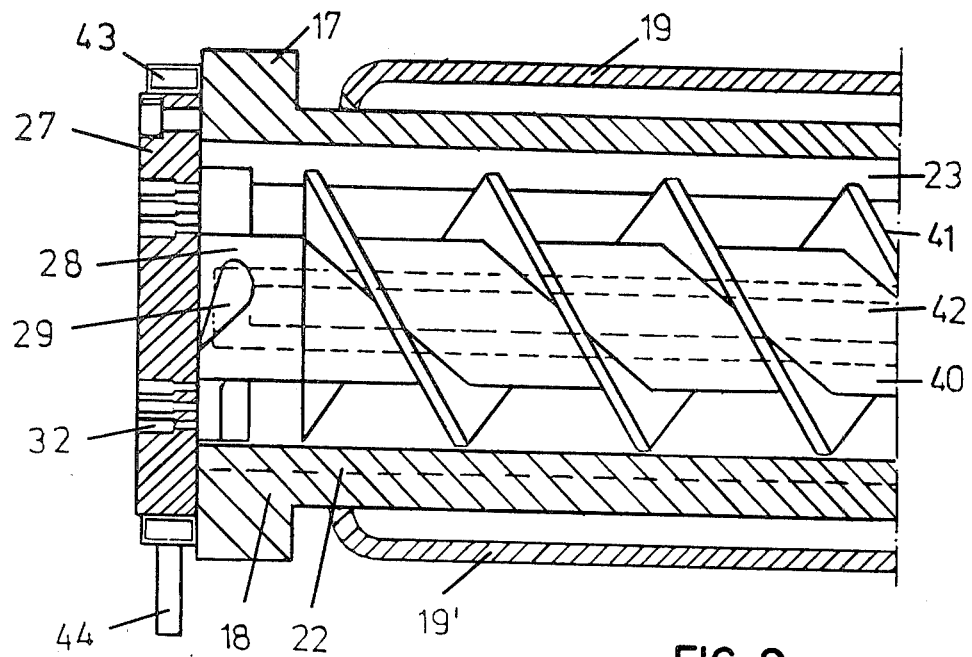
FIG. 9 shows a modification of FIG. 8 in which the conveyor is provided with an internal cutting device.
Figure 10:
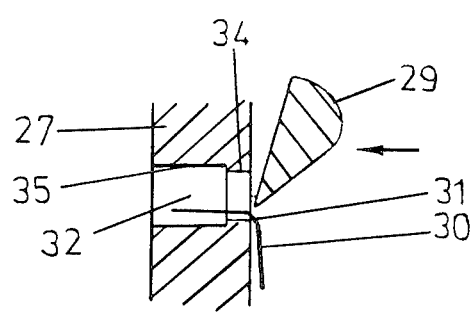
FIG. 10 illustrates the cutting operation carried in the modification of FIG. 9.

In FIGS. 9 and 10 a modification of the granulating device is illustrated wherein inside cutting is carried out instead of outside cutting as accomplished by the rapidly rotating cutter located beyond the discharge side of the nozzle plate. For this purpose, a ring 28 is provided with cutter members 29, the ring 28 and cutter members 29 rotating with the shaft and the ring being mounted at the end of the worm-gear shaft 40 so that the cutter members 29 press against the inner side 27 of the nozzle plate while the material moves forward. Cutter members 29 make a dividing cut in the material while it is being pushed through the holes 32 in the nozzle plate as shown in FIGS. 9 and 10, the so-cut and divided material leaving predetermined uniformly spaced breaking points which are marked in the emerging extruded strips or fillets. As a result, the fillets readily break into uniform and regular pieces of their own accord after they emerge from the special nozzle. This cutting means of FIGS. 9 and 10 has special advantage and importance for materials which are based upon fiber filler mixtures, and in particular, long fiber fillers. If long fiber fillers get trapped or caught in the round drilled holes of the nozzle plate, these fibers are cut by the rotating cutter 29 but with conically shaped holes, the cutter 29 would not meet any clearly defined edge and holes 32 in the modification of FIGS. 9 and 10 are shaped in a special manner with short nozzle lips 34 which serve as guides and with edges 31 for inside cutting, these edges 31 especially aiding cutting through fibers used as filler in the material. On the discharge side of the special nozzle holes 32 there is provided a counterbored enlargement which facilitates removal of the strip of fillet.

EXAMPLES OF MIXING AND GRANULATING THERMOSETTING PLASTIC MIXTURES WITH THE APPARATUS AND METHOD OF THE INVENTION

The following examples illustrate a few representative mixtures of thermosetting resin composition which can be prepared and granulated by the apparatus and method of the present invention. These representative thermosetting resins being well-known to the art and being recognized as being particularly difficult to granulate in uniform particle size, in dust-free condition and free from lumps, these thermosetting compositions being found especially sensitive to the action of elevated temperature and pressure, e.g., heat and pressure after homogenization to quickly harden. It is a characteristic of these compositions that not only does heat and pressure accelerate rapid hardening but further promotes undesirable cross-linking in the conversion of the resin material to the thermoset condition. These materials have hitherto not been possible to granulate in a continuous operation in a worm-gear material preparation machine having a large production capacity without encountering difficulties and in particular it has not been possible to provide continuous trouble free operation for a conventional period of about at least eight hours.

EXAMPLE 1

A premixed mixture of unsaturated polyester resin, fillers and/or chalk, additives and hardeners, etc., is fed into the filling funnel 1 of the material mixing and kneading machine 2, the machine 2 having a diameter of 140 mm and a length of 7 L/D. The mixing, homogenization and kneading is carried out in a known manner. The homogenized mixture is discharged through the special nozzle 24 and the material passes through the holes in the nozzle plate and into the connecting shaft. The temperature at the nozzle is maintained at 90° C. The operation of the preparation machine is continuous and the material output is at a high value of 400 kg per hour. The material entering the connecting shaft falls through the connecting shaft by gravity to enter into the feeding apparatus of the granulating device 4. The granulating device 4 is constructed in the form of a worm conveyor with a single worm shaft having a length of 4.5 L/D, an inclination to the horizontal of 0.5 D and a diameter of 180 mm. The temperature within the granulating device is tempered at 50° C. This temperature within the device is maintained by varying the temperature of the heating jackets 19 and 19' respectively, of the housing to 70° C. This is called tempering.

The emergent material emerges from the special nozzle 24. The special plate of the special nozzle is provided with 190 holes each having a diameter of 3.6 mm. Because of the shaping of the soft material the material emerges in the form of fillets. These fillets are cut off by the rapidly rotating cutter 26.

In general, the holes in the nozzle plate have diameters varying between 2 and 5 mm. The finer perforations being especially desired when small granulating machines are used for processing and where a diameter of the shaft prevents the proper handling of coarse granules. The preferred worm conveyor, which is used in the granulating machine, is a single-worm conveyor, but it is possible to use multiple-worm conveyors, but if these are used, the low angle of inclination of the flight must be adjusted in a special manner. Thus, for example, a double-worm conveyor has an inclination of 1 D instead of 0.5 D. In order to prevent a pressure buildup, the special block nozzle 24 is tempered by means of the heating collar 43 with an inflow of heating fluid at a temperature of 100° C. so that, on the one hand, the optimal flow characteristics of the material are maintained while passing through the drilled holes 33 in the nozzle plate so that, on the other hand, the surface of the hot material does not immediately become brittle in the air flow or inert gas flow after leaving the nozzle, so that the extruded material can be conveyed pneumatically while it is still soft at least in its core. It then goes from the cutting apparatus 37 to the cooling section 38 in free fall. The temperature range in which the extruded material becomes brittle extends from 50° C. down to 30° C. after cutting. The small sized granulated material is very suitable for charging a transfer molding press. The small size granulated material is also useful for the production of fine grained molded products with a very small dust content and particularly for molded regular shapes which permit optimal finishing operations by grinding.

EXAMPLE 2

This example illustrates preparation and granulation of a premixed mixture of thermosetting phenolic resin cotton fibers, additives and hardeners. The mixture is fed into the intake of a material-preparation kneading machine 2 in regular, measured amounts. The mixture emerges from the end of the housing of the mixing machine under free discharge under the force of gravity and the temperature of the mixture is maintained at approximately 115° C. by suitably heating the machine. The discharge mixture is extruded in the form of strips or fillets and these fall freely through the connecting shaft 3 into the intake of the granulating device 4, which is constructed as a worm conveyor and has a length of 4.5 L/D, an inclination of 0.5 D and a nominal diameter of 180 mm. The temperature of the worm-gear 40 is brought or tempered at 70° C. by means of raising the temperature of the heating collar 43 to 100° C., a heating fluid passing through the heating collar to maintain this 100° C. The worm shaft 40 rotates at 20 rpm. The perforated nozzle plate 24 has 250 holes each with a diameter of 3.6 mm. After emerging from these holes the fillets are cut to yield a regular and uniform granulated material which is conveyed pneumtically to the cooling section 38. The throughput in continuous operation is 350 kg per hour.

Another advantage of the procedure just described is the fact that the preparation and production of small sized granulated material of thermosetting phenolic resin cotton fibers is very noisy because of the hardness of the material and the present production in Example 2 makes much less noise. In contract with conventional granulating requiring grinding and crushing processes, no noisy crushing and grinding plants are used. Furthermore, the granulating device 4 runs quietly and is a slow running piece of equipment, and consequently the noise it produces in operation falls in a favorable range of noise frequencies and does not constitute a noise hazard to personnel.

We claim:

1. A continuous process for the production of dust-free uniform small particles from soft reactive plastic and volatile ingredients including fillers, additives and hardeners which quickly harden after they are mixed to become thermosetting, said process comprising:

first pre-mixing the reactive and volatile and additive ingredients in a mixing and kneading material preparation machine to form a soft mixture;

passing said soft mixture through a tube, and then homogenizing the mixture in a heated pelleting machine comprising a continuously slow working heatable and coolable conveyor screw arranged in a heatable and coolable housing which is fitted at the outlet end with a heated multi-hole die-plate and rotating cutting knives, the length L of said conveyor screw being from 3 to 5 times the diameter D thereof and the number of revolutions of the conveyor screw amounting to from 10 to 25 revolutions per minute, in which the conveyor screw flight has a pitch of the screw of about 0.5 D and has a thick core in relation to the outer diameter and is arranged in a housing divided by web ridges into longitudinal channels, in which housing the width of the web ridges is smaller than the depth of the longitudinal grooves whereby the homogenized material passes through the multi-hole die-plate without any building up of pressure while preventing rotation of the material being processed;

cutting the soft plastic mixture emerging from said multi-hole die-plate by said rotating cutting knives;

conveying the cut pellets through a feed pipe fitted with a suction device to remove volatiles and pneumatically feeding the cut pellets to a cooling station.

2. A continuous process for the manufacture of dust-free pelletized substantially uniform thermosetting particles of homogeneously mixed and proportioned volatile reactants, soft plastic, and reactive hardener components and fillers which harden quickly after mixing comprising the steps of:

first pre-mixing these ingredients in a mixing and kneading material preparation machine to form a premix which is dropped through a tube;

then feeding the premix into a pelletizing machine conveyor, said soft pre-mix emerging from the outlet of said tube by gravity into the inlet of said heated pelletizing machine being conveyed by a second worm conveyor in a housing in said pelletizing machine at low pressure and out of a multi-hole die plate under conditions which prevent pressure build-up due to the worm rotating at a low rate of rotation of from about 10 rpm to about 25 rpm while the spiral of said worm has a small angle of inclination to the horizontal expressed along the vertical axis of about 0.5 D to 1.0 D where D is the diameter of the housing and the path of the mixture is defined by the length L of the housing being from 3 to 5 times the diameter D, the inner wall of the housing being subdivided longitudinally by web ridges into sections, the web ridges having a width dimension smaller than the depth dimension or groove of the web ridges to thereby convey the soft material toward the multi-hole die plate without undue build-up of pressure and enhancing the conveying action to provide a low pressure transport of said soft material through the multi-hole die-plate;

cutting the soft mass after it passes through said multi-hole die-plate to provide pelletized particles of uniform size ready for drying;

pneumatically conveying said pelletized particles to a cooling station; and cooling said particles.

3. A process as claimed in claim 2 wherein suction is applied between said first and second worm mixers to remove volatiles before the soft mixture from said first worm mixer is fed by gravity into said second worm mixer and said pneumatic conveyor is fed with an inert gas.

4. A process as claimed in claim 3 wherein said cutting adjacent to said multi-hole nozzle is carried out by cutting blades which rotate.

* * * * *